United States Patent [19]

Magyar et al.

[11] Patent Number: 4,747,617
[45] Date of Patent: May 31, 1988

[54] BELT CLAMPING GUIDE LOOP

[75] Inventors: Joseph J. Magyar, Rochester; Wendy M. Schoof, Mt. Clemens, both of Mich.

[73] Assignee: General Motors Corporation, Detroit, Mich.

[21] Appl. No.: 54,790

[22] Filed: May 27, 1987

[51] Int. Cl.⁴ .............................................. B60R 22/00
[52] U.S. Cl. .................... 280/808; 280/806; 242/107.2
[58] Field of Search ............. 280/808, 801, 806, 807; 242/107.2; 297/483, 479, 478, 477, 480

[56] References Cited

U.S. PATENT DOCUMENTS

| | | | |
|---|---|---|---|
| 3,847,434 | 11/1974 | Weman | 242/107.2 |
| 3,886,374 | 5/1975 | Lefeuvre | 307/105 B |
| 3,898,715 | 8/1975 | Balder | 24/196 |
| 3,911,535 | 10/1975 | Mauron | 242/107.2 |
| 3,924,875 | 12/1975 | Lefeuvre | 297/477 |
| 4,009,510 | 3/1977 | Lindblad | 280/808 |
| 4,208,770 | 6/1980 | Takada | 242/107.2 |
| 4,306,735 | 12/1981 | Pfeiffer et al. | 280/807 |
| 4,310,175 | 1/1982 | Pickett | 280/801 |
| 4,310,176 | 1/1982 | Furusawa et al. | 280/801 |
| 4,341,359 | 7/1982 | Jahn | 242/107 |
| 4,371,127 | 2/1983 | Shimogawa et al. | 242/107.2 |
| 4,438,551 | 3/1984 | Imai | 242/107.2 |
| 4,491,343 | 1/1985 | Föhl | 280/801 |
| 4,549,769 | 10/1985 | Pilarski | 297/483 |
| 4,549,770 | 10/1985 | Kurtti | 297/479 |
| 4,687,253 | 8/1987 | Ernst et al. | 280/806 |

FOREIGN PATENT DOCUMENTS 52-13221  2/1977  Japan.

Primary Examiner—John J. Love
Assistant Examiner—Karin L. Ferriter
Attorney, Agent, or Firm—Charles E. Leahy

[57] ABSTRACT

A belt clamping guide loop includes a frame mounted on the vehicle body and a bracket mounted for limited vertical movement relative the frame. A belt deflecting loop is carried by the frame. A spring acts between the frame and the bracket to establish a normal position of the bracket and yields in response to the imposition of an occupant restraint load on the belt to permit movement of the bracket. A first clamping jaws is fixedly mounted on the frame below the guide loop and a second clamping jaw is movably mounted on the frame in spaced relation from the first clamping jaw to define a belt passage therebetween. A toggle linkage acts between the bracket and the second clamping jaw to forcibly move the second clamping jaw into belt clamping proximity with the first clamping jaw in response to the downward movement of the bracket. A pin and slot acts between the second clamping jaw and the frame to define a path of angularly converging movement of the second jaw toward the first jaw so that the second jaw is self-energized into clamping action with the belt.

3 Claims, 1 Drawing Sheet

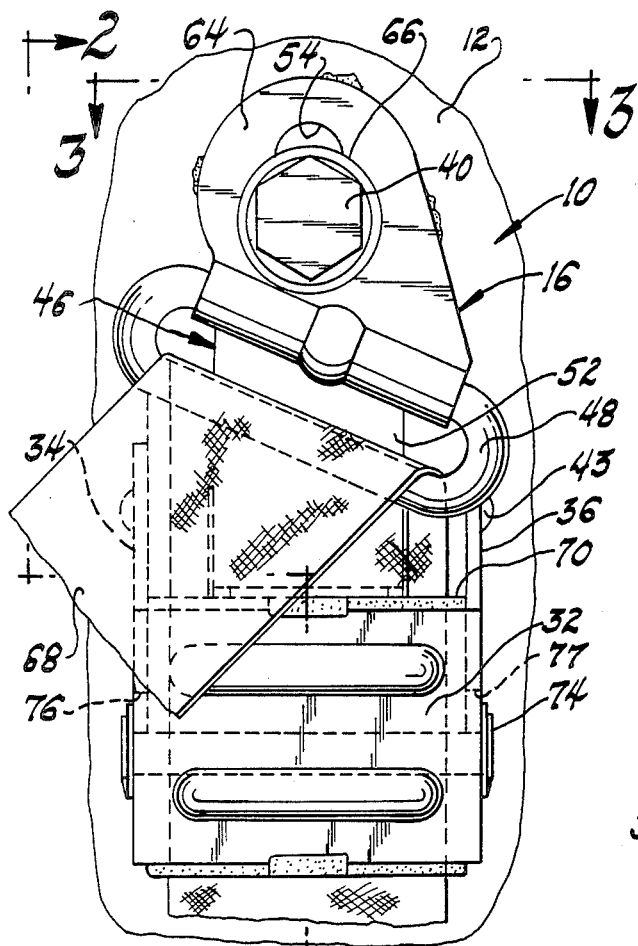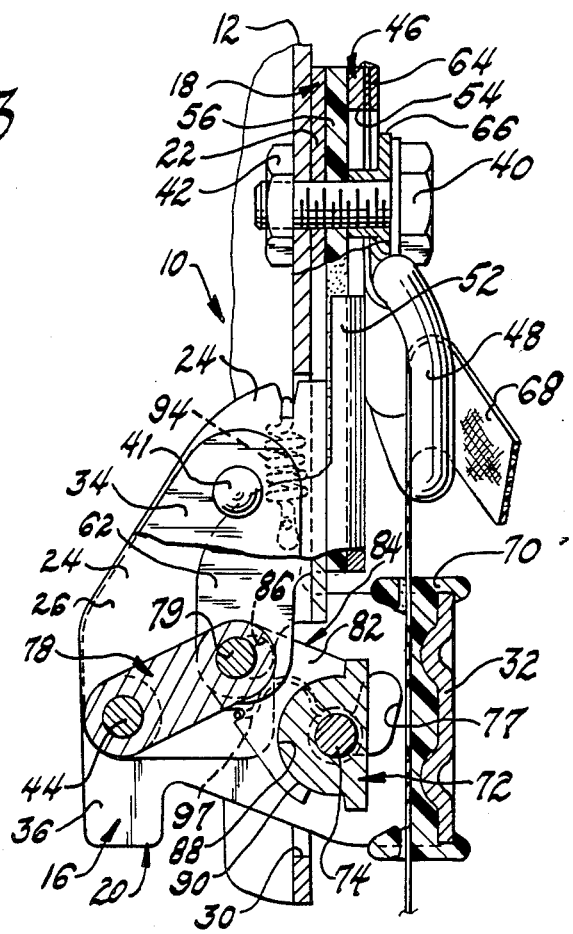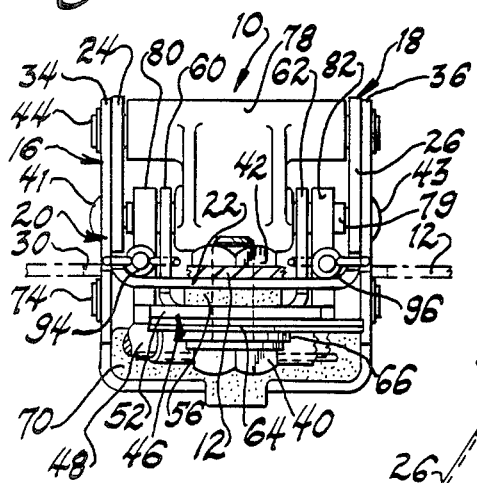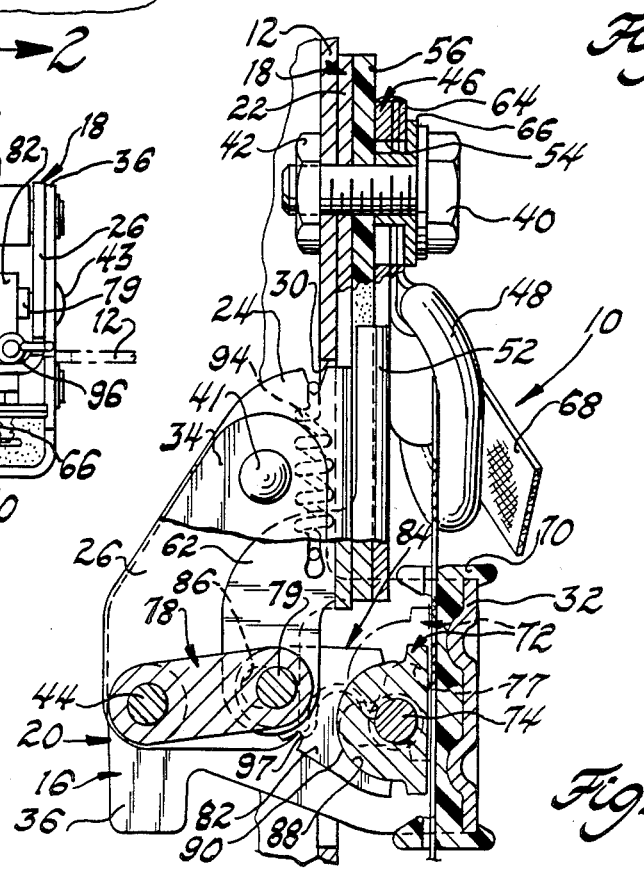
Fig. 1
Fig. 2
Fig. 3
Fig. 4

BELT CLAMPING GUIDE LOOP

The invention relates to a guide loop assembly for a motor vehicle occupant restraint system and more particularly provides a clamping mechanism which clamps the belt against sliding movement through the loop assembly in response to imposition of an occupant restraint load on the belt.

BACKGROUND OF THE INVENTION

It is well known in motor vehicle seat belt systems to mount a guide loop on the pillar to deflect the belt from a seat belt retractor mounted on the floor to a diagonal position across the occupant upper torso. These seat belt retractors typically include a locking mechanism which locks the belt against unwinding from the retractor in response to the onset of a sensed vehicle deceleration condition.

It is also known in prior art to provide a clamping mechanism which is associated with the guide loop assembly and functions to clamp the belt against sliding movement through the guide loop in consequence of imposition of an occupant restraint load on the belt. Examples of such belt clamping guide loops include U.S. Pat. Nos. Pilarski 4,549,769 issued Oct. 29, 1985; Weman 3,847,434 issued Nov. 12, 1974; Balder 3,898,715 issued Aug. 12, 1975; Lindblad 4,009,510 issued Mar. 1, 1977; Jahn 4,341,359 issued July 27, 1982; Lefeuvre 3,886,374 issued May 27, 1975; Lefeuvre 3,924,875 issued Dec. 9, 1975; Takada 4,208,770 issued June 24, 1980; Mauron 3,911,535 issued Oct. 14, 1975; Pickett 4,310,175 issued Jan. 12, 1982; Shimogawa et al 4,371,127 issued Feb. 1, 1983 and Furusawa et al 4,310,176 issued Jan. 12, 1982.

The present invention provides a new and improved clamping guide loop assembly.

SUMMARY OF THE INVENTION

According to the invention the belt clamping guide loop includes a frame mounted on the vehicle body and a bracket mounted for limited vertical movement relative the frame. A belt deflecting loop is carried by the bracket. A spring acts between the frame and the bracket to establish a normal position of the bracket and yields in response to the imposition of an occupant restraint load on the belt to permit vertical downward movement of the bracket. A first clamping jaw is fixedly mounted on the frame below the guide loop and a second clamping jaw is movably mounted on the frame in spaced relation from the first clamping jaw to define a belt passage therebetween. A toggle linkage acts between the bracket and the second clamping jaw to forcibly move the second clamping jaw into belt clamping proximity with the first clamping jaw in response to the downward movement of the bracket. A guide means, such as a pin and slot, acts between the second clamping jaw and the frame to define a path of angularly converging movement of the second jaw toward the first jaw so that the second jaw is self-energized into clamping action with the belt by the occupant restraint load on the belt urging movement of the second jaw along the angularly converging path.

Accordingly, the object, feature and advantage of the invention resides in the provision of a belt clamping guide loop in which occupant restraint load imposed on the guide loop acts through a toggle linkage to initiate clamping of a movable jaw against a fixed jaw, and the further provision of a guide means defining angularly converging motion of the movable jaw towards the fixed jaw so that the occupant restraint load self-energizes the movable jaw into clamping action with the belt in addition to the clamping action induced by the toggle linkage.

DESCRIPTION OF THE DRAWINGS

These and other features, objects and advantages of the invention will become apparent upon consideration of the specification and appended drawings in which:

FIG. 1 is a front elevation view of the belt clamping guide loop assembly of this invention;

FIG. 2 is a sectional view taken in the direction of arrows 2—2 of FIG. 1 and showing the belt normally unclamped for free sliding movement through the guide loop;

FIG. 3 is a top view taken in the direction of arrows 3—3 of FIG. 1; and

FIG. 4 is a view similar to FIG. 2 but showing the belt clamped against sliding movement through the belt clamping guide loop assembly.

DESCRIPTION OF THE PREFERRED EMBODIMENT

Referring to FIGS. 1, 2 and 3, there is shown a belt clamping guide loop assembly generally indicated at 10 which is mounted on a suitable part of the vehicle body, such as pillar 12. The guide loop assembly 10 includes a frame 16 defined by an inner frame member 18 and an outer frame member 20. The inner frame member 18 includes a base wall 22 which abuts against the pillar 12 and a pair of laterally spaced arms 24 and 26 which reach through a rectangular aperture 30 of the pillar 12. The outer frame member 16 includes a base wall 32 and laterally spaced legs 34 and 36 which respectively overlie the laterally spaced arms 24 and 26 of the inner frame member 18. The base wall 22 of the inner frame member 18 is attached to the pillar 12 by bolt 40 and nut 42. The outer frame member 20 is attached to the inner frame member 18 by rivets 41 and 43 acting between the arms of the inner and outer frame members and by a pin 44 which extends between the arms of the inner and outer frame members.

A bracket 46 is mounted on the frame for limited vertical movement and carries a belt guide loop 48. The bracket 46 includes a base wall 52 which has an elongated aperture 54 receiving the bolt 40 to permit limited vertical movement of the bracket 46 relative the inner frame member 18. A slide 56, preferably of a low friction material, is interposed between the base wall 52 of bracket 46 and the base wall 22 of the inner frame member 18. The bracket 46 has laterally spaced apart arms 60 and 62 and the guide loop 48 is attached to the bracket 46 by a hanger strap 64 welded to the bracket 46. A shouldered washer 66 extends through the elongated aperture 54 in the bracket 46 and an aligned elongated aperture in the hanger strap 64 to hold the bolt 40 off from the bracket 46 sufficiently to enable the vertical movement of bracket 46 and the hanger strap 64. The occupant restraint belt 68 extends vertically along the pillar 12 from a seat belt retractor, not shown, mounted at the lower end of the pillar 12, and is deflected through the guide loop 48 diagonally across the shoulder of the seated occupant.

As best seen in FIG. 2, a plastic belt clamping jaw 70 is fixedly mounted on the base wall 32 of the outer frame member 20. A second clamping jaw 72 is movably mounted on the outer frame member 20 by a pin 74 which extends through the second clamping jaw 72 and through slots 76 and 77 provided respectively in the laterally spaced legs 34 and 36 of the outer frame member 20. As best seen in FIG. 2, the slot 77 is configured to extend angularly with respect to the first belt clamping jaw 70 so that the second belt clamping jaw 72 is guided closer and closer along an angularly converging path toward the first clamping jaw 70 upon movement of the pin 74 along the slots 76 and 77.

As best seen in FIG. 2, the second belt clamping jaw 72 is moved along the slots 76 and 77 by a toggle linkage comprised of a first- toggle link 78 having one end mounted on the pin 44 and its other end connected to the laterally spaced apart legs 80 and 82 of a second toggle link 84 by a pin 79. The pin 79 also extends through aligned elongated apertures provided in the spaced apart arms 60 and 62 of the bracket 46. One of these apertures is aperture 86 in arm 62.

As best seen in FIG. 2, the second toggle link 84 has a circular pocket 88 which receives a circular surface 90 of the second belt clamping jaw 72 so that the clamping jaw 72 is pivotal relative to the second toggle link 84.

A pair of coil tension springs 94 and 96 have their ends connected respectively to the arms 24 and 26 of the inner frame member 18 and the arms 60 and 62 of the bracket 46 and function to lift the bracket 46 to its raised position of FIG. 2 in which the toggle linkage is retracted and the second clamping jaw 72 is spaced away from the first clamping jaw 70.

Operation

In operation it will be understood that a vehicle emergency condition causes the seat belt retractor mounted on the vehicle below the clamping guide loop 10 to lock so that an occupant restraining load will be imposed on the seat belt 68. When the occupant restraining load acting downwardly on the guide loop 48 exceeds the force of the springs 94 and 96, the springs yield permitting the bracket 46 and guide loop 48 to move downwardly from the position of FIG. 1 to the position of FIG. 2. This downward movement of the bracket 46 acts through the pivot pin 79 and causes the toggle links 78 and 84 to be extended into a more straight line relationship so that the second clamping jaw 72 is moved along the angular slots 76 and 77 and into contact with the belt 68 to clamp the belt 68 against the fixed clamping jaw 70. Once the initial engagement of the movable clamping jaw 72 with the belt is obtained, the occupant restraining force acting on the belt and inducing vertical upward movement of the belt through the clamping jaws will induce a further upward movement of the movable clamping jaw 72 along the angular converging path defined by the slots 76 and 77 so that the movable clamping jaw 72 is self-energizedly clamped even tighter against the first clamping jaw 70.

Thus the downward movement of the bracket 46 acts through the toggle linkage to initiate belt clamping action, and then the upward acting force of the belt inducing upward movement on the second clamping jaw urges the second clamping jaw along the angularly converging path defined by the pin and slot to provide additional clamping of the belt.

As best seen in FIG. 2, a spring retainer 97 reaches between the toggle link 84 and the pivot pin 74 to both retain the second movable clamping jaw 72 on the toggle link 84 and also establish the second clamping jaw 72 at its normal position, FIG. 2, with the belt clamping end face of the second clamping jaw 72 generally parallel with the belt 68.

It will be understood that when the occupant restraint load is relieved from the belt 68, the springs 94 and 96 will act to raise the bracket 46 vertically to its FIGS. 1 and 2 position so that the second clamping jaw 72 is retracted away from the belt 68 by virtue of the pin 74 riding along the slots 76 and 77.

Thus it is seen that the invention provides a new and improved belt clamping guide loop. It will be understood that this belt clamping guide loop could also be mounted on the upper rear corner of the door in a passive belt system.

We claim: The embodiments of the invention in which an exclusive property or privilege is claimed are defined as follows:

1. A restraint belt guide loop assembly adapted to be mounted on a vehicle body and slidably receive the belt from a retractor and deflect the belt across the occupant comprising:

a frame mounted on the body;

a bracket mounted for limited movement relative the frame and having a belt deflecting loop carried thereby so that imposition of an occupant restraint load upon the deflecting loop by the belt induces movement of the bracket relative to the frame;

a first clamping jaw fixedly mounted on the frame and a second clamping jaw mounted for movement relative to the frame to define therebetween a belt passage through which the belt slides;

a toggle linkage acting between the bracket and the second clamping jaw to forcibly move the second clamping jaw into belt clamping proximity with the first clamping jaw upon occurrence of movement of the bracket induced by the imposition of occupant restraint load on the deflecting loop;

and means adapted to provide a defined path of angularly convergent movement of the second clamping jaw toward the first clamping jaw so that subsequent to the initial belt clamping provided by the toggle linkage the second clamping jaw is self energized into clamping action with the belt independently of the action of the toggle linkage by the occupant restraint load on the belt inducing said angularly convergent movement of the second clamping jaw toward the first clamping jaw.

2. A restraint belt guide loop assembly adapted to be mounted on a vehicle body and slidably receive the belt from a retractor and deflect the belt diagonally across the occupant shoulder, comprising:

a frame mounted on the body;

a bracket mounted for limited vertical movement relative the frame and having a belt deflecting loop carried thereby so that imposition of an occupant restraint load upon the deflecting loop by the belt induces vertical downward movement of the bracket relative to the frame;

a first clamping jaw fixedly mounted on the frame and a second clamping jaw movably mounted on the frame to define therebetween a belt passage;

a toggle linkage acting between the bracket and the second clamping jaw to forcibly move the second clamping jaw into belt clamping proximity with the first clamping jaw upon occurrence of vertical downward movement of the bracket induced by the imposition of occupant restraint load on the deflecting loop;

and guide means adapted to provide a defined path of angularly convergent movement of the second clamping jaw toward the first clamping jaw so that the second clamping jaw is self energized into clamping action with the belt by the occupant restraint load on the belt inducing said angularly convergent movement of the second clamping jaw.

3. A restraint belt guide loop assembly adapted to be mounted on a vehicle body and slidably receive the belt from a retractor and deflect the belt diagonally across the occupant shoulder, comprising:

a frame mounted on the body;

a bracket mounted for limited vertical movement relative the frame and having a belt deflecting loop carried thereby so that imposition of an occupant restraint load upon the deflecting loop by the belt induces vertical downward movement of the bracket relative to the frame;

spring means acting between the frame and the bracket to position the bracket at a normal vertical location relative the frame and yielding at a predetermined occupant restraint load imposed on the guide loop by the belt to permit vertical downward movement of the bracket;

a first clamping jaw fixedly mounted on the frame below the guide loop;

a second clamping jaw movably mounted on the frame in laterally spaced relation with the first clamping jaw to define therebetween a belt passage through which the belt passes;

a toggle linkage acting between the bracket and the second clamping jaw to forcibly move the second clamping jaw into belt clamping proximity with the first clamping jaw upon occurrence of vertical downward movement of the bracket induced by the imposition of occupant restraint load on the deflecting loop;

and guide means acting between the frame and the second clamping jaw to provide a defined path of angularly convergent movement of the second clamping jaw toward the first clamping jaw so that the second clamping jaw is self energized into clamping action with the belt by the occupant restraint load on the belt inducing said angularly convergent movement of the second clamping jaw.

* * * * *